US005454073A

United States Patent [19]

Fukushima et al.

[11] Patent Number: 5,454,073

[45] Date of Patent: Sep. 26, 1995

[54] DRAWING MANAGEMENT DEVICE HAVING ABILITY TO RETRIEVE AND DISPLAY A DESIRED AMOUNT OF DATA WITHIN A DESIRED DISPLAY TIME

[75] Inventors: Manabu Fukushima, Hitachi; Mikio Yoda, Ibaraki; Kazuo Tsutsui, Hitachiota, all of Japan

[73] Assignee: Hitachi, Ltd., Tokyo, Japan

[21] Appl. No.: 800,009

[22] Filed: Nov. 29, 1991

[30] Foreign Application Priority Data

Nov. 30, 1990 [JP] Japan .................................... 2-329009
Nov. 30, 1990 [JP] Japan .................................... 2-329017

[51] Int. Cl.[6] .................................................... G06F 3/153
[52] U.S. Cl. ............................................ 395/158; 395/135
[58] Field of Search .................................... 395/158, 159, 395/157, 128, 135, 161, 154; 340/744, 728

[56] References Cited

U.S. PATENT DOCUMENTS 4,661,811 4/1987 Gray et al. .............................. 340/744
4,737,916 4/1988 Ogawa et al. ...................... 395/135 X
4,737,927 4/1988 Hanabusa et al. ....................... 295/135
4,742,558 5/1988 Ishibashi et al. .................. 340/728 X
4,847,788 7/1989 Shimada ................................. 395/135
5,019,961 5/1991 Addesso et al. .................... 395/161 X
5,119,081 6/1992 Ikehira ............................... 395/128 X
5,148,154 9/1992 Mackay et al. ...................... 395/154 X

*Primary Examiner*—Heather R. Herndon
*Assistant Examiner*—Cliff N. Vo
*Attorney, Agent, or Firm*—Antonelli, Terry, Stout & Kraus

[57] ABSTRACT

A drawing management device for managing the drawing of an entire facility, such as a water supply facility, as digital information. This device includes a unit for storing drawings with priorities obtained by separating the entire facility drawing into sub-facility drawings located at plural levels, a selective display designating unit for displaying a desired sub-facility drawing obtained by selecting the number of levels considering the priority from the storing unit, and a display unit for displaying the desired sub-facility drawing in response to the signal from the selective display designating unit. By suitably selecting a desired level considering the priority, only a necessary and sufficient facility drawing can be displayed swiftly.

14 Claims, 12 Drawing Sheets

FIG. 4A
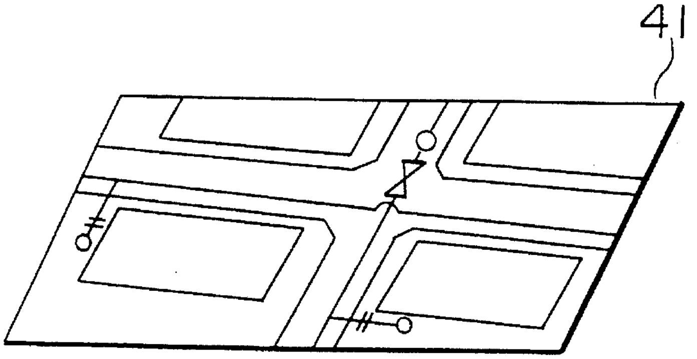
FIG. 4B
FIG. 4C
FIG. 4D
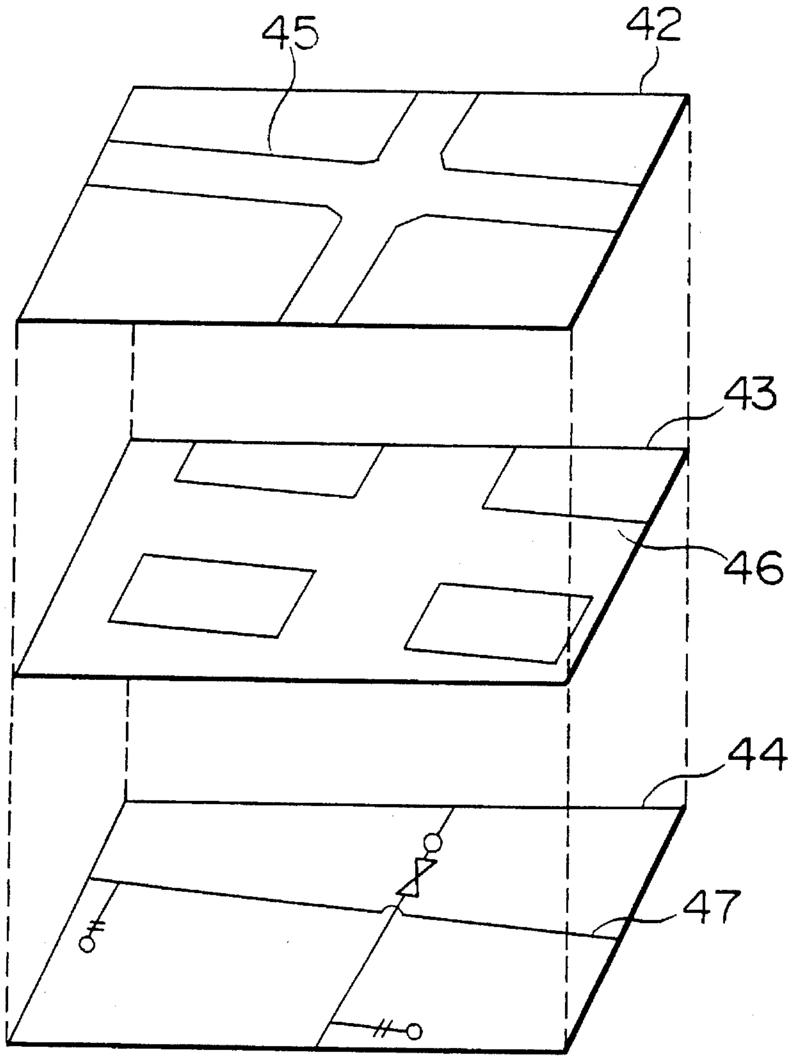

FIG. 5

| | |
|---|---|
| 10101 | 1 |
| 10102 | 3 |
| 10103 | 1 |
| ⋮ | ⋮ |
| n | 2 |

DRAWING DISPLAYED
AT PRIORITY OF 1

DRAWING DISPLAYED
AT PRIORITY OF 2

DRAWING DISPLAYED
AT PRIORITY OF 3

FIG. 10

| LEVEL NUMBER | SELECTION OF DISPLAY LAYER | | CURRENT PRIORITY | AMOUNT OF CHANGING PRIORITY | PRIORITY AFTER HISTORY CHANGE |
|---|---|---|---|---|---|
| | ADDITION | CANCELLATION | | | |
| 10101 | | ○ | 1 | +1 | 2 |
| 10102 | ○ | | 3 | −1 | 2 |
| 10103 | | | 1 | 0 | 1 |
| 10104 | ○ | | 4 | −1 | 3 |
| ⋮ | | | ⋮ | | |
| n | | ○ | 2 | +1 | 3 |

DRAWING MANAGEMENT DEVICE HAVING ABILITY TO RETRIEVE AND DISPLAY A DESIRED AMOUNT OF DATA WITHIN A DESIRED DISPLAY TIME

BACKGROUND OF THE INVENTION

The present invention relates to a drawing management device for managing the drawings of facilities, such as a pipe laying system of a water and gas supply, a wiring system for electric power and telephone, a road for vehicles, etc., in the form of digitized information. It should be noted that the term 'drawing' as used herein refers to a drawing of the facility, such as a water supply, a machine design drawing, a road traffic map, etc.

Traditionally, the state of facilities, such as a pipe system for water and gas supply, and a wiring arrangement for electric power and telephone communication, has been provided in the form of a drawing drafted on a sheet of paper or polyester film. In this case, each change in the facilities requires a modification to be made to the drawing. The work of modifying the drawing must be performed manually with the result that a long time and much labor are required and also the possibility that errors will be made in modifying the drawing is relatively strong. In order to solve such a problem, it has been proposed to manage the facility drawing in the form of its digitized information. More specifically, as disclosed in JP-A-63-254565, the management is performed by displaying the many facility drawings (e.g., topography drawings, system drawings and symbol drawings) stored is digital data in a file device on a display device under computer control. The work for modifying the drawings is also made under computer control for the drawings displayed on the display device.

However, the above prior art has the following defects. In displaying large scale drawing data including e.g. qualifying lines, the processing therefor is executed at a very low speed since the data amount to be drawn or displayed during a unit time is very large. This is because even if only a part of the drawing is required, all the data including minute and detailed character information, which is difficult to recognize, are displayed. Therefore, the above prior art system is poor in its usability and efficiency as a facility display system.

The present invention has been accomplished in order to eliminate the above defect of the prior art, and intends to provide a drawing management device that can surely attain a user (operator)'s objectives, i.e. has a function of displaying the object required by a user swiftly and exactly. This is because, where very detailed drawing information is not necessary, it is important to display only the drawing information within the range required by an operator as soon as possible, but not all of the items of the stored detailed drawing information.

SUMMARY OF THE INVENTION

An object of the present invention is to provide a drawing management device that can swiftly display drawing information with a degree of detail desired by an operator.

In order to attain the above object, a certain limit is given to the displaying time and priorities are automatically allotted to display objects located at several levels so that all necessary and a minimum amount of information can be displayed within a limited time.

The priorities of drawing data relative to the facility for water supply are automatically allotted at three to five levels. An operator updates the priority in sequence from history information with a changed display level, thereby to provide a desired drawing swiftly.

The above and other objects and features will be more apparent from the following description taken in conjunction with the accompanying drawings.

BRIEF DESCRIPTION OF THE DRAWINGS

FIGS. 4A, 4B, 4C and 4D are views showing level arrangements of graphic data;

FIG. 5 is a view for explaining the priorities of display;

FIG. 10 is a table for explaining the process of changing the priority allotted for each level number in accordance with the history of the operation of changing the level to be displayed;

DESCRIPTION OF THE PREFERRED EMBODIMENTS

Figure 1:
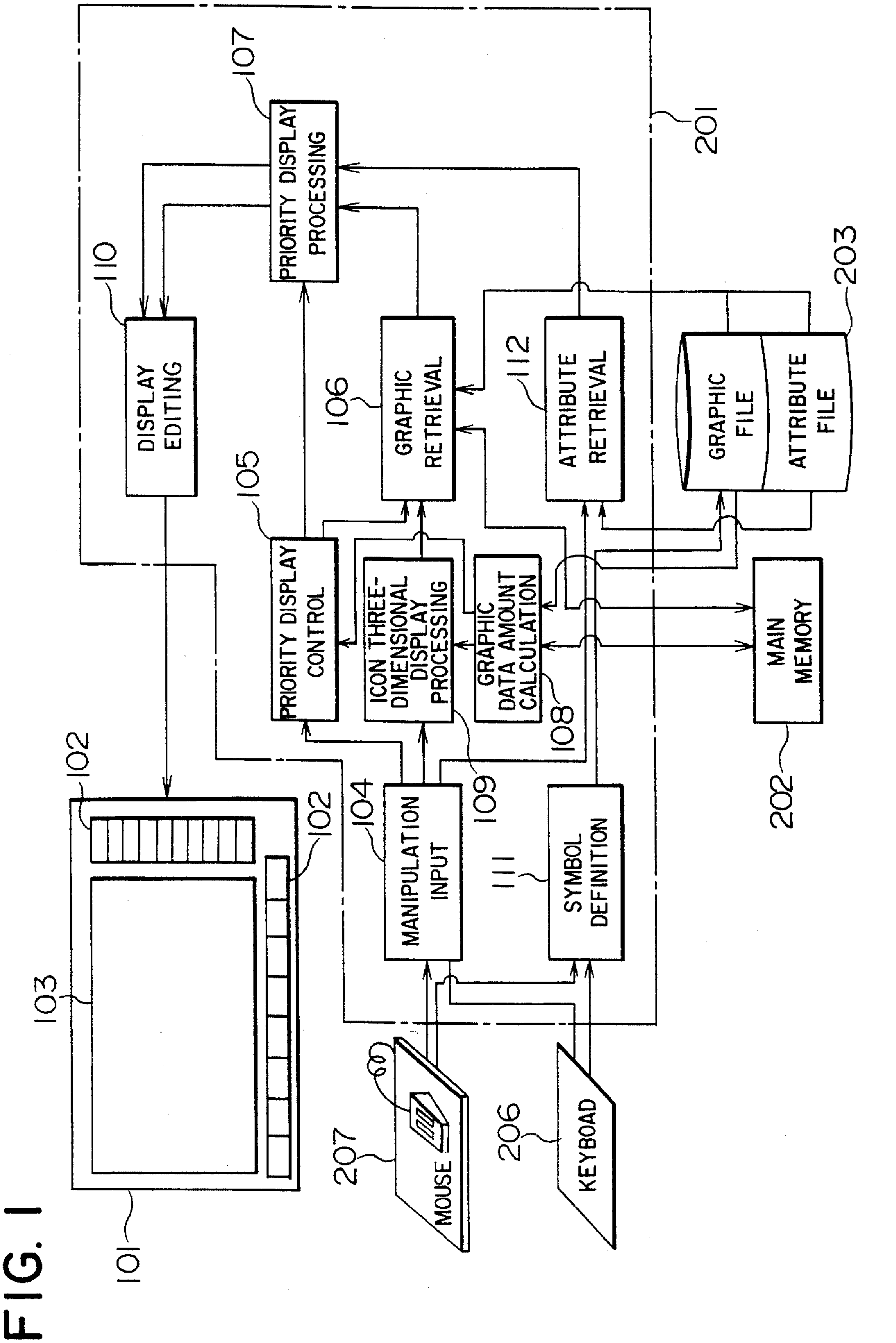
FIG. 1 is a block diagram of an arrangement of a drawing management device according to one embodiment of the present invention.

Referring now to the drawings, an explanation will be given of one embodiment of the present invention.

Figure 2:
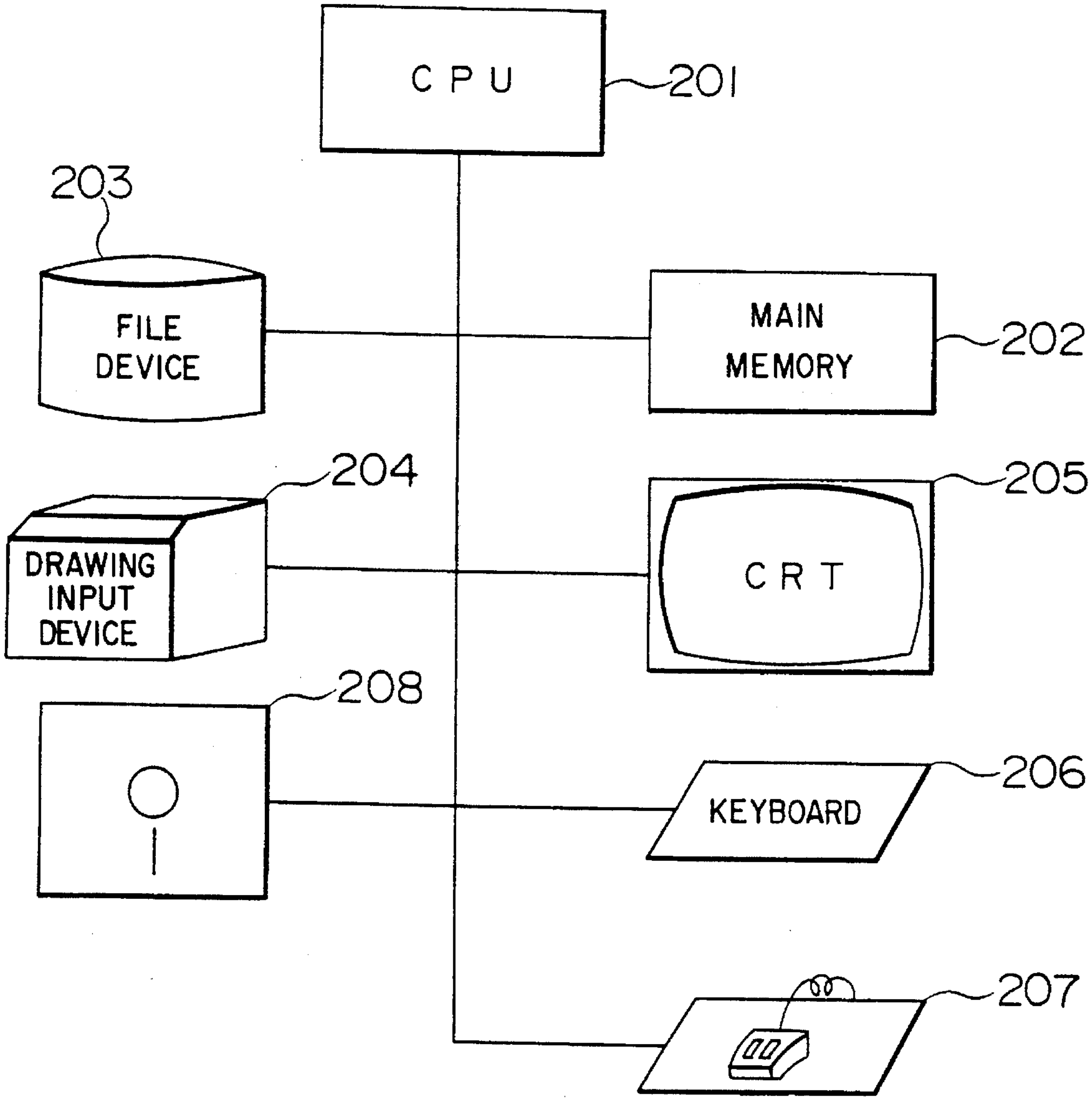
FIG. 2 is a block diagram for explaining the operation and function of the drawing management device according to the above embodiment.

FIG. 2 shows the basic arrangement for explaining the operation and function of one embodiment of the present invention shown in FIG. 1.

In FIG. 2, facility drawing data is stored in a file device 203. The facility drawing data may include graphic or figure data of topography, tube (i.e., pipe) paths, and the like, and attribute data (the name of a town , the name of an individual, the diameter of a tube, the kind (e.g. vinyl) of the tube, etc.) expressed by characters and numerical values relative to the graphic representation. The graphic data to be stored in file device 203 is supplied from a drawing input device 204, which operates in such a manner that a drawing drafted on a sheet of paper is scanned at regular intervals in accordance with the light and dark areas of the read data so that a digital image thus obtained provide encoded data.

Figure 3A:
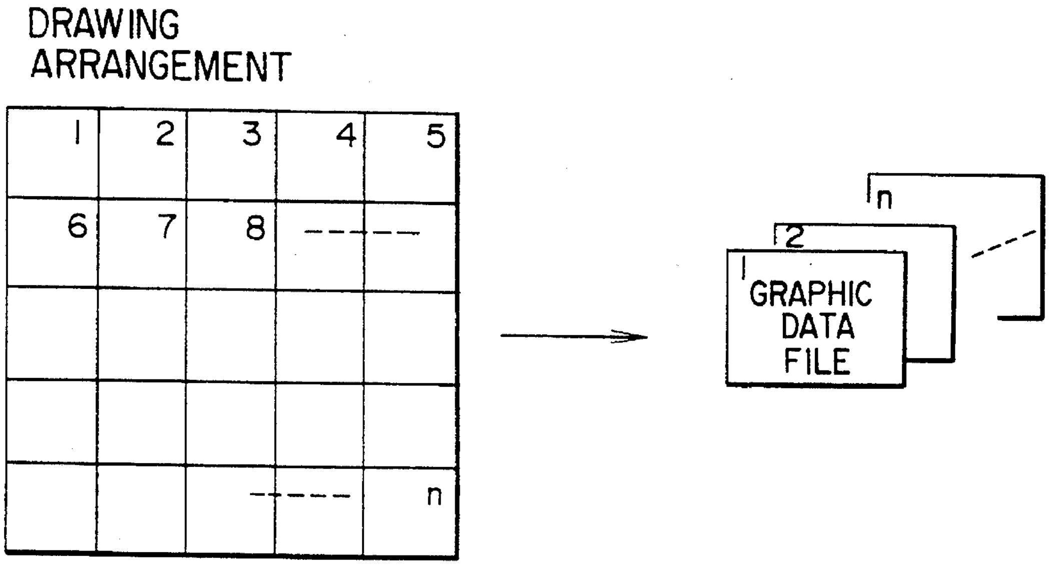
FIGS. 3A and 3B are views showing the relationship between drawing arrangements stored in a file device and graphic coordinate positions.

The facility drawing may be composed of a plurality of drawings, such as shown in FIG. 3A, which are individually separated to provide graphic data files.

Figure 3B:
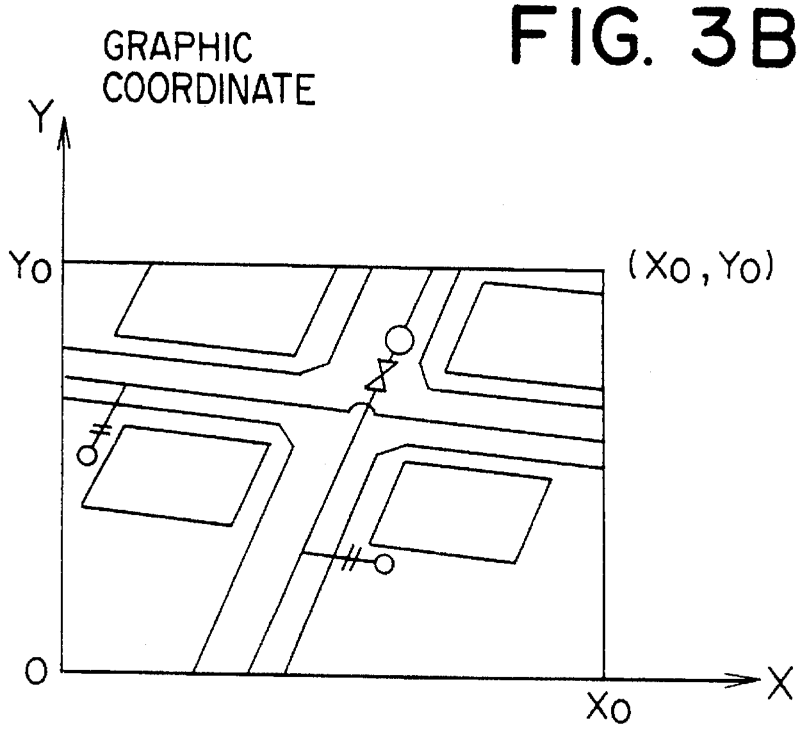

The graphic data is expressed on rectangular coordinates as shown in FIG. 3B. The lengths in the X and Y directions are determined by the size of the drawing concerned. This graphic data is expressed in such a way that it is separated in plural levels such as, a level 42 including road data 45 (FIG. 4B), a level 43 including house corner data (FIG. 4C) and a level 44 including tube path data 47 (FIG. 4D). The data located at these levels when superposed as required to provide the entire graphic data is shown as a level 41 (FIG. 4A).

On the other hand, the attribute data is supplied to the file device 203 from a data inputting device, which collectively supplies data from a keyboard 206 or a floppy disk 208.

An operator manipulates a mouse 207 to display the drawing on a display device (CRT) 205 as follows. First, the operator manipulates the mouse 207 to move a cursor CU to one of a plurality of icons for selecting functions displayed on the CRT screen so that the function intended is specified. If the icon for 'drawing retrieval' is specified, a central processing unit (CPU) searches the drawing data concerned (composed of graphic data and related attribute data) to be temporarily stored in a main memory 202. The main memory 202 operates to store the programs for executing the processings, such as search and editing of the drawing data, as well as the drawing data being processed. The drawing data temporarily stored in the main memory 202 is edited by the CPU 201 in accordance with the valid display coordinate that is a display region of the CRT 205, and thereafter the edited data is displayed on the CRT 205. The operator can recognize the contents of a desired or objective drawing from the displayed image.

Further, in order to recognize the details of the drawing, the image is displayed so as to be partially enlarged. To this end, the cursor CU is moved using the mouse 207 to specify any square region within the CRT display region in terms of ends of a diagonal line so that a part of the drawing is enlarged or reduced. Actually, a part of the drawing data concerned stored in the main memory 202 is edited in an enlarged or reduced way, and the drawing data thus edited is displayed on the CRT 205.

An explanation will be given of the level display with priorities that permits a desired drawing to be displayed within a predetermined time.

FIG. 1 shows a block diagram of one embodiment of the present invention in which the CPU 201 executes the processing of level display with priorities. In FIG. 1, the display screen or field 101 is composed of an icon region 102 where the mouse is manipulated to select the function of retrieval or searching and displaying a desired drawing, and a drawing displaying region 103 where the drawing retrieved by mouse manipulation is displayed. The mouse 207 is used to select the function from the icon region 102 and to specify the location of the drawing to be displayed on the drawing displaying region 103. The keyboard 206 is used to set the condition of searching a drawing. The data inputted from the keyboard 206 and the mouse 207 are supplied to an operation input unit 104 in the CPU 201. The drawing data is previously stored in the file device 203.

An explanation will be given of the relationship between the function of each of the functional units within the CPU 201, and an operation of manipulation and display.

A desired drawing is retrieved or searched using an index drawing, drawing number, etc. and thereafter is displayed on the display device. The operation of the CPU 201 in such a display processing process will be explained below. First, using the mouse 207, the item 'drawing retrieval' is selected or designated on the icon region 102 for mouse manipulation. This selective designation is inputted to a manipulation input section 104 thereby to activate a priority display control section 105. The priority display control section 105 directs a graphic retrieval section 106 to retrieve the desired drawing (data). Further, when the level to be displayed in the graphic data retrieved from the graphic file 203 is changed, the priority display control section 105 serves to automatically change the priority level for the corresponding level on the display priority table previously defined in accordance with the changing history of the level concerned. Specifically, as shown in FIG. 10, the priority allotted for each level number is changed in accordance with the history of the operation of changing the level to be displayed. If the operation is directed to addition of the level to be displayed, the priority of the level number concerned is decreased by 1, and if it is directed to cancellation of the level to be displayed, the priority is increased. It should be noted that the amount of changing the priority must be limited in the range between a minimum value and a maximum value which are previously defined.

Figure 11:
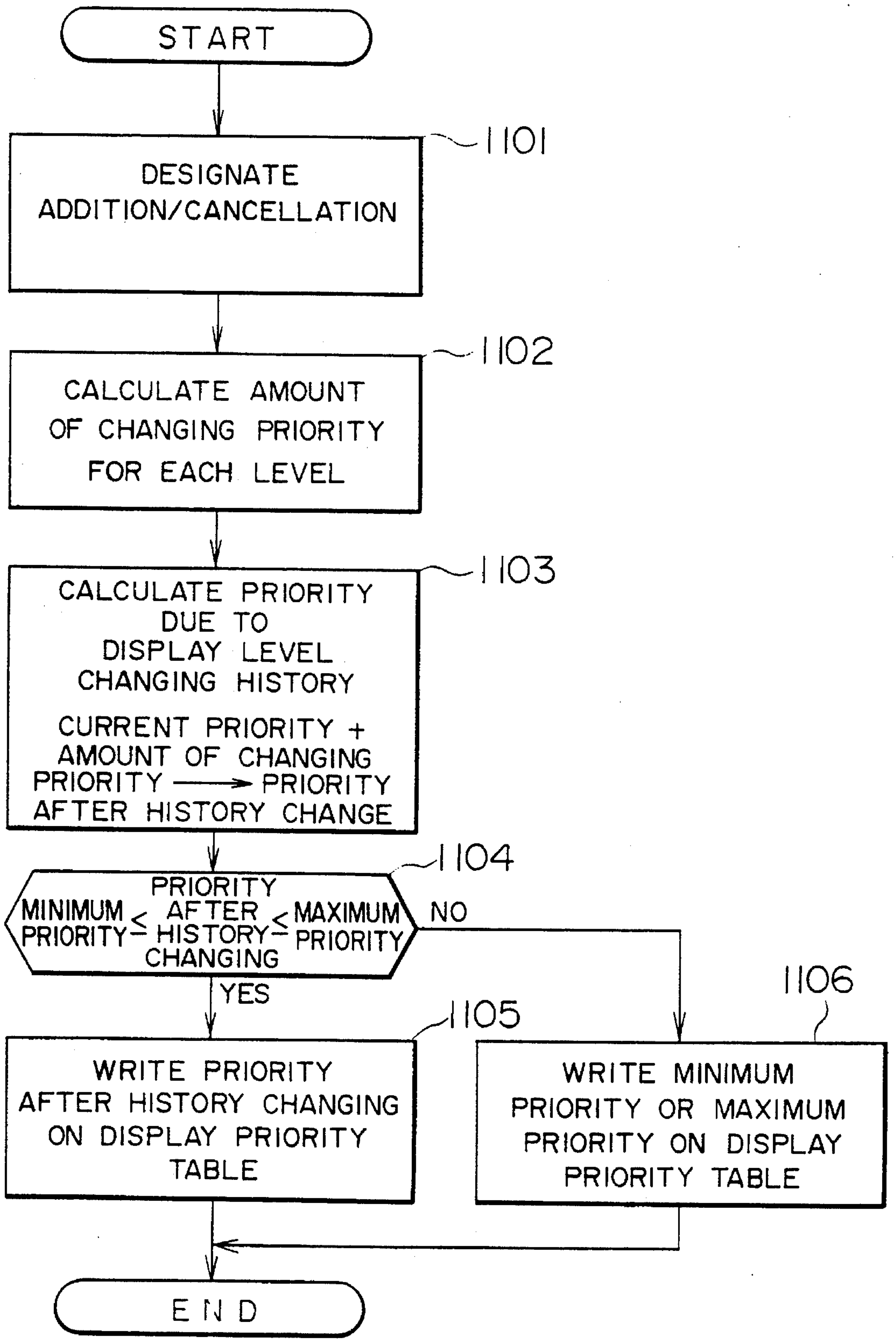
FIG. 11 is a flowchart of the processing shown in FIG. 10.

FIG. 11 shows the flow of the processings illustrated in FIG. 10. First, in step 1101, when the operator initiates the operation of selecting the level to be displayed, the presence or absence of addition/cancellation of the level to be displayed is designated for the level number concerned on the display priority table. In step 1102, the amount of changing the priority for each level number is calculated as −1 or +1 in accordance with the presence or absence of the addition/cancellation of the level to be displayed. In step 1103, the priority due to the history of changing the level to be displayed is calculated on the basis of the above calculation result. In step 1104, the priority after the history change is checked to see if it is within the allowable range. If it is within the allowable range, in step 1105, the priority after the history changing is directly written in the display priority table. If it is outside the range, in step 1106, where it is smaller than the minimum limit, the allowable minimum priority is written in the display priority table, and where it is larger than the upper limit, the allowable maximum priority is written in the display priority table.

Figure 9A:
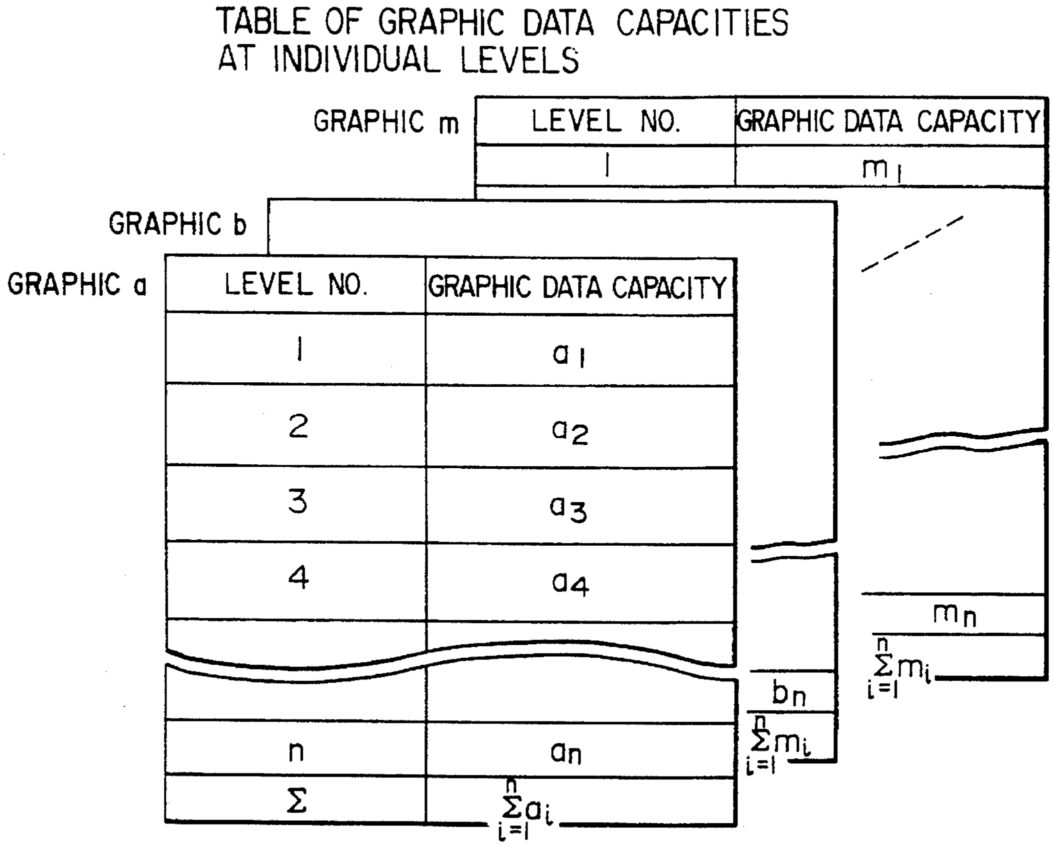
FIGS. 9A and 9B are views showing the graphic data capacity for each drawing and the three-dimensional shape of a retrieval icon corresponding to it, respectively.
Figure 12:
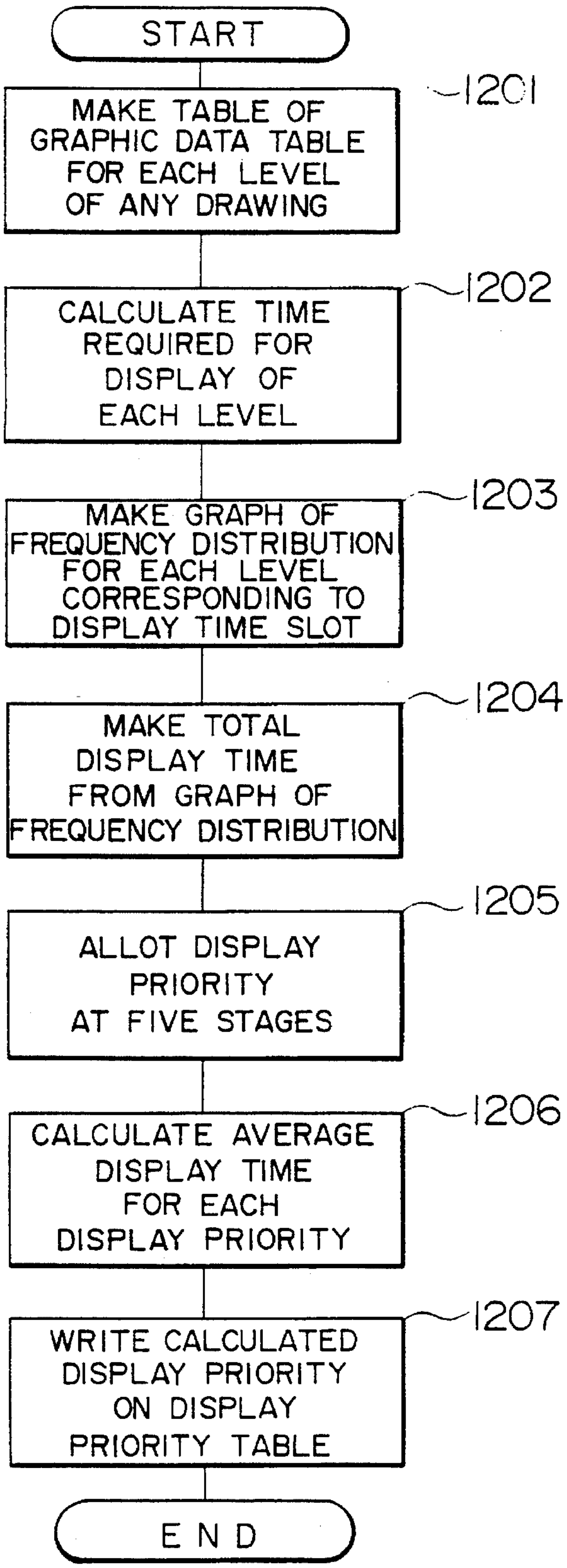
FIG. 12 is a flowchart of the process of making a display priority table in accordance with a display time.
Figure 13A:
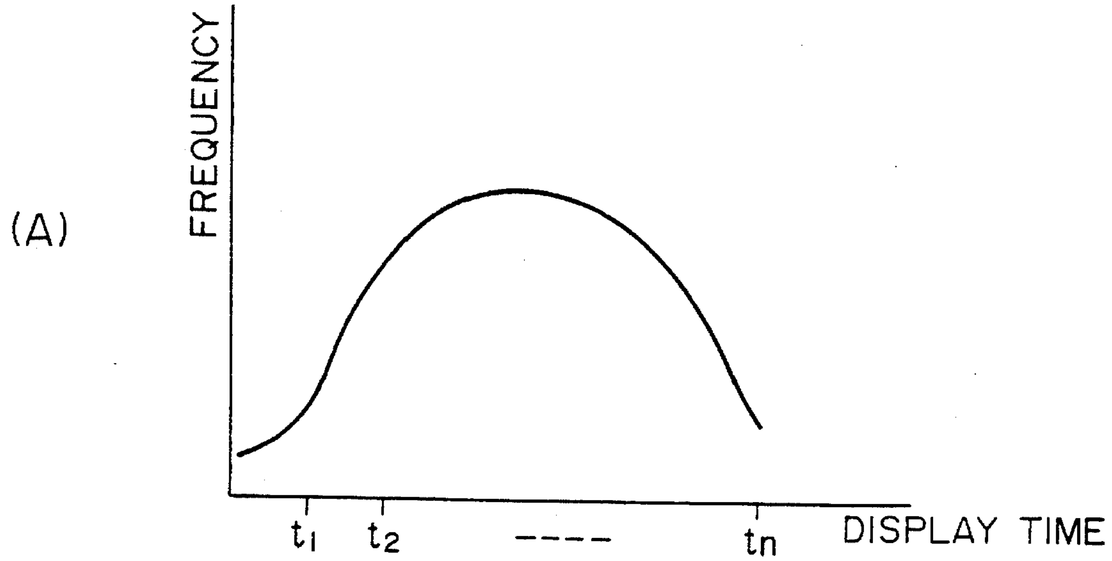
FIGS. 13A and 13B are a graph showing the distribution of the frequency for each level for each display time, and a graph showing the total time of display verses frequency.
Figure 13B:
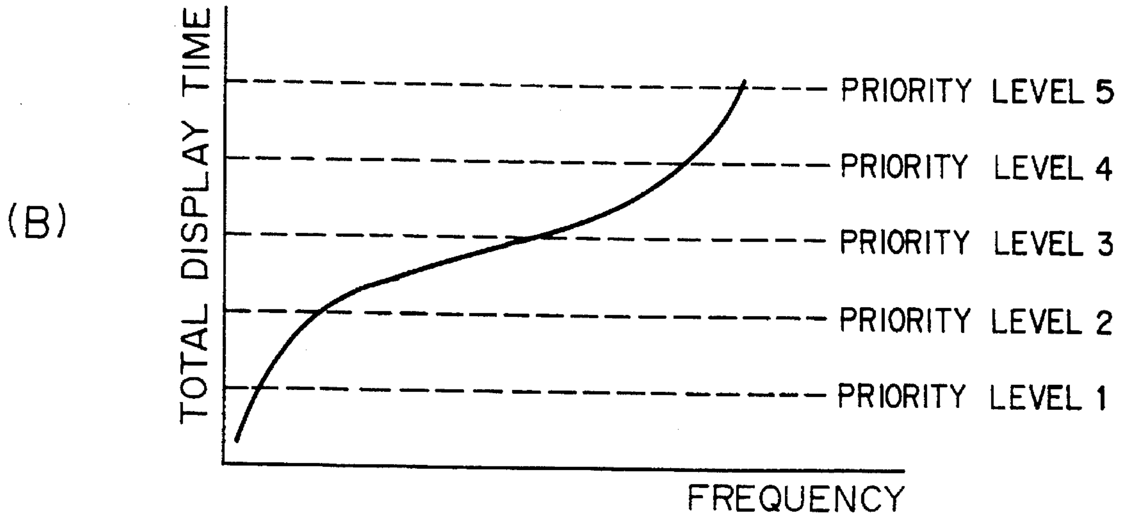

The method of defining the display priority table of FIG. 5 during a displaying time will be explained below. FIG. 12 shows the process of making the display priority table of FIG. 5 during the displaying time. First, in step 1201, a table of the capacity of the graphic data for each level as shown in FIG. 9A is made for any drawing specified by the operator. In step 1202, using the graphic data capacity table for each level, the time required for display is calculated on the basis of the amount of data displayed per unit time. In step 1203, a graph (FIG. 13A) showing the distribution of the frequency for each level which depends on an individual time slot is formed. In step 1204, a graph showing the total display time as shown in FIG. 13B is made on the basis of the above graph showing the distribution. In step 1205, the display priority levels at e.g. five stages are successively allotted on the graph showing the total display time in accordance with the total display times. In step 1206, the average display times corresponding to the display priority levels at five stages are calculated. Specifically, the total display time corresponding to each priority level is divided by its frequency to calculate the average display for each priority level. Finally, in step 1207, a priority is allotted to the level corresponding to the average display time and the priority is written on the display priority table.

Returning to FIG. 1 again, when the graphic retrieval section 106 has retrieved the drawing data, a priority display processing section 107 is activated. Then, the amount of data which can be displayed during the display time previously set by a user or operator is calculated, and the amount of data is reported to the priority display processing section 107. The graphic retrieval section 106 retrieves the drawing data from the drawing files in the file device 203 on the basis of the number of the desired drawing and stores the retrieved drawing data in the main memory 202; it sends the data to the priority display processing section 107 immediately after retrieval of all the desired data has been completed. The priority display processing unit 107 takes in the drawing data and sequentially sends the drawing data at the level to be displayed to a display editing section 110 on the basis of a display priority table (FIG. 5) and the amount of data to be displayed within the prescribed time. The display editing processing section 110 draws the desired drawing on the drawing display region 103 on the basis of the drawing data sent.

FIG. 5 shows display priority tables on which the numbers of levels and their priority are stored. In this table, the smaller number of priority is defined as having a higher priority, but may be defined in a way reverse thereto.

Figure 6A:
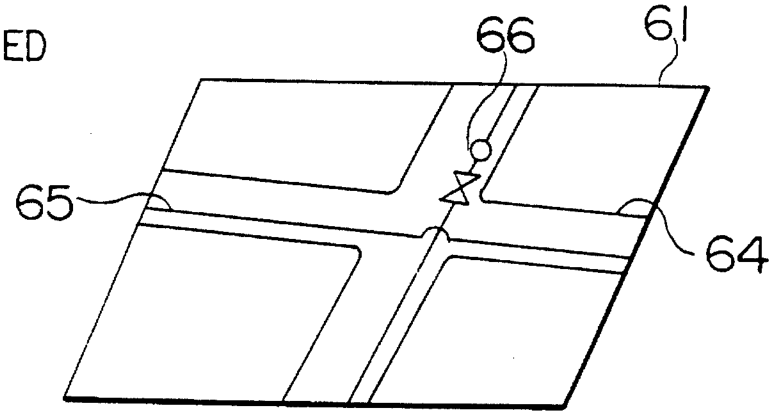
FIGS. 6A, 6B and 6C are views showing examples of displayed drawings according to selected priorities.
Figure 6B:
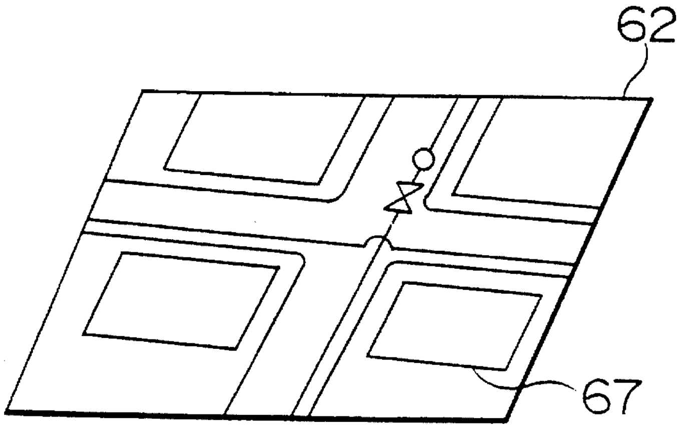
Figure 6C:
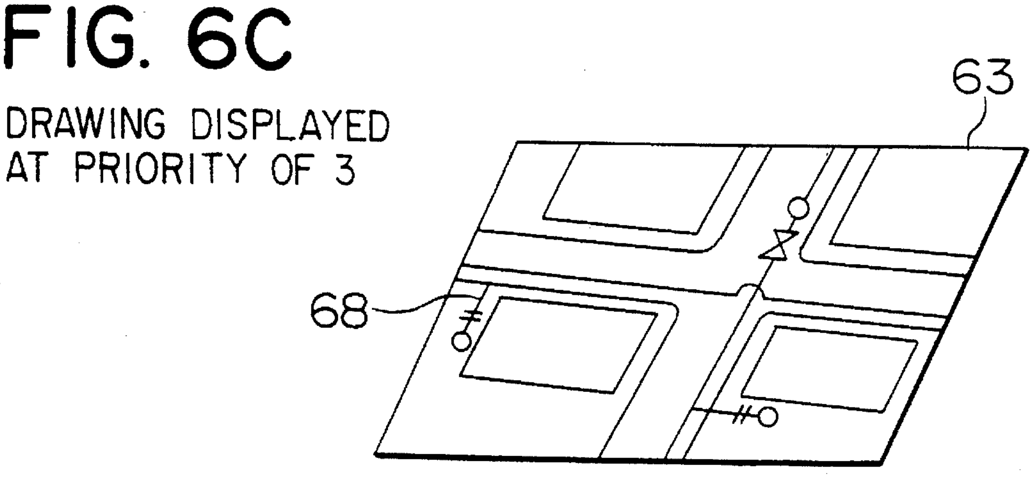

FIGS. 6A, 6B and 6C show examples of drawings displayed for individual priorities. FIG. 6A shows a drawing 61 displayed with the priority of 1 in which the most important level group including a road 64, a water supply tube path 65 and a symbol 66 on the water supply tube path 66 is displayed. FIG. 6B shows a drawing 62 displayed with the priority of 2 in which a house corner level 67 is superposed on the graphic data with the priority of 1. FIG. 6C shows a drawing 63 with the priority of 3 in which the level relative to water supply devices 67 is superposed on the graphic data with the priorities of 1 and 2.

Figure 7:
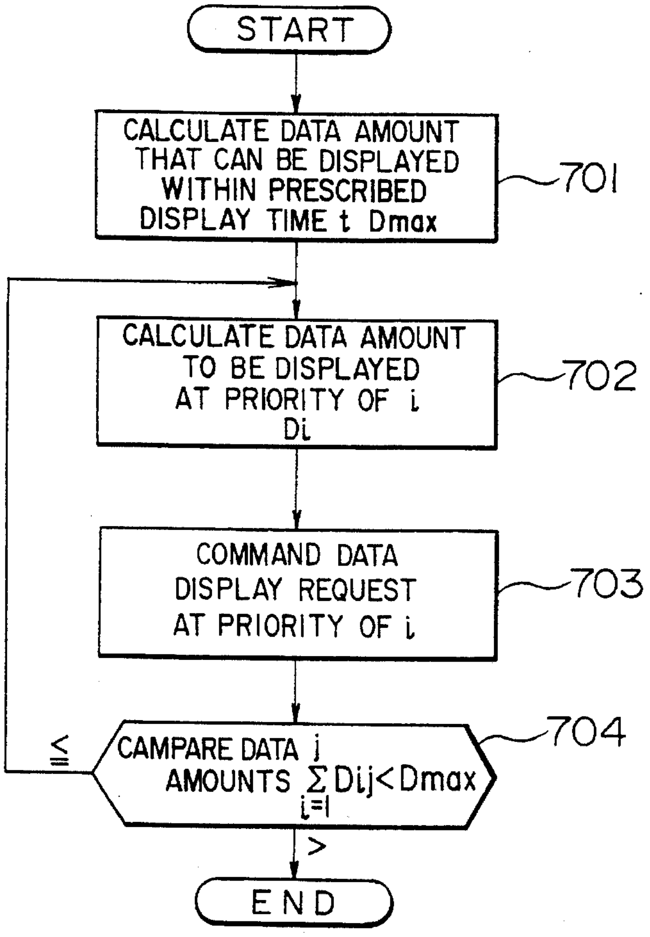
FIG. 7 is a flowchart showing the processing flow in a priority display control unit.

FIG. 7 shows the processing flow in the priority display control section 105. First, in step 701, the amount of data that can be displayed during a prescribed display time t is calculated using the following equation:

$$D_{max}=t\times D_0 \quad (1)$$

where $D_{max}$: the largest amount of data which can be displayed during the time t t: prescribed display time $D_0$: the amount of data displayed during a unit time In step 702, the amount of displayed data corresponding to a priority i is calculated, and in step 703, the request of data display with the priority of i is reported to the priority display processing section 107. Finally, in step 704, the total amount of displayed data up to the priority of i is calculated and the calculated amount of data is compared with the largest amount of data that can be displayed. If the former is within the range of the latter, the processing for the succeeding priority of i+ 1 is repeated.

Figure 8:
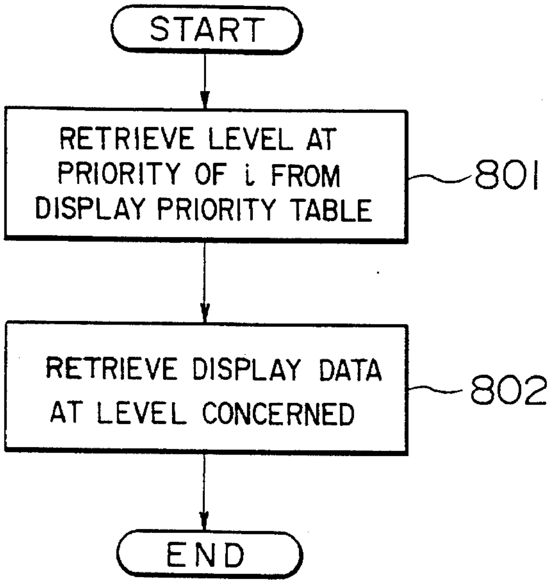
FIG. 8 is also a flowchart showing the processing flow in a priority display control unit.

FIG. 8 shows the processing flow in the priority display processing section 107. First, in step 801, the level corresponding to the priority of i is retrieved from the display priority table. In step 802, the display data corresponding to the level concerned is retrieved from the graphic retrieval section 106 and the retrieval result is supplied to the graphic editing section 110.

In this way, only the graphic data corresponding to the prescribed retrieval time can be automatically selected so that the drawing data with a high priority can be retrieved without being influenced by the complexity of the drawing concerned.

In designating the item 'drawing retrieval', in order to previously recognize the data capacity corresponding to the drawing data, a process reflecting the approximate data capacity of the drawing concerned on the icon to be retrieved will be performed as follows.

Figure 9B:
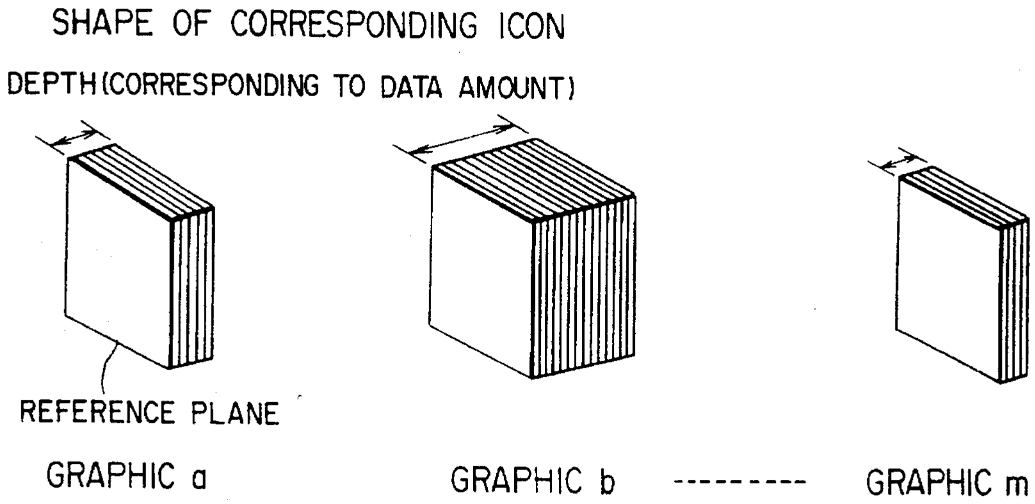

The mouse 207 is manipulated to move the cursor CU to the icon region 102 so that the icon of the item 'capacity three-dimensional display' is selected or designated on the icon region 102. This selective designation is inputted to the manipulation input section 104 of the CPU 201, and thereafter a request for the capacity of the three-dimensional display is reported to an icon three-dimensional display processing section 109. In previously registering drawing data in graphic files of the file device 105, a graphic data amount calculating section 108 calculates the capacity of the graphic data for each level and stores the calculation result on the main memory 202 as shown in FIG. 9A. The icon three-dimensional display section 109 forms the icon shape on the basis of the total capacity of data calculated by the graphic data amount calculation section 108 using the table of graphic data capacities (FIG. 9A) on the main memory 202 in accordance with the level of the desired drawing to be displayed. As seen from FIG. 9B, the icon shape is formed so that the depth of the three-dimensional icon corresponds to the capacity of the graphic data. The depth of the icon is converted from the maximum value of graphic data capacity previously defined as 100%. The three-dimensional icon is edited by the display editing section 110 as drawing data on the icon region 102 and the edited drawing data is displayed on the drawing display region 103.

In this way, the approximate data capacity of the drawing can be easily determined from the icon shape prior to the drawing retrieval so that the time taken for the retrieval and data processing can be recognized swiftly and easily.

The present invention can be applied to a so-called navigation device mounted in a car which can quickly display road traffic information on a display device.

We claim:

1. A drawing management and display device for displaying digital information of a system drawing, showing an entire system having a plurality of information items, within a desired display time, said drawing management and display device comprising:

a means for referencing a total display time required for displaying said system drawing, for determining a plurality of different display time priority levels each having a different display time which is shorter than said total display time, and for storing said system drawing as a plurality of sub-drawings each representing the same area of said system drawing and having a different number of said plurality of information items which make up said entire system such that display of each of said sub-drawings can be accomplished within a different said different display time, said sub-drawings being stored with respective priorities each of which represents an ability to display the sub-drawing within a different said different display time;

a selective display designating means for automatically selecting one of said sub-drawings stored in the storing means on the basis of the priority thereof in order to accomplish display within said desired display time; and a means for displaying selected said sub-drawings within said desired display time in response to said selecting operation of said selective display designating means.

2. A drawing management and display device according to claim 1, wherein at least one of said sub-drawings includes all of the information items which make up said same area of said system drawing.

3. A drawing management and display device according to claim 1, wherein all of said sub-drawings show said information items with the same magnification.

4. A drawing management and display device according to claim 1, wherein each of the sub-drawings shows information items of a different type from the information items shown on all sub-drawings of a lower priority.

5. A drawing management and display device according to claim 4, wherein the ability to display a sub-drawing within a desired display time is determined by the number and type of information items included in the sub-drawing.

6. A drawing management and display device according to claim 1, wherein said entire system is a gas/water supply pipe-laying system.

7. A drawing management and display device according to claim 1, wherein said entire system is an electric power/telephone wiring system.

8. A drawing management and display device according to claim 1, wherein said entire system is a machine designating system.

9. A drawing management and display device according to claim 1, wherein said entire system is a road traffic information map.

10. A drawing management and display device according to claim 1, wherein said plurality of sub-drawings which represent the same area of said system drawing include at least three sub-drawings.

11. A drawing management and display device according to claim 1, wherein said displaying means includes a means for displaying a three-dimensional retrieval icon for respective sub-drawings, the amount of data in a respective sub-drawing being indicated by a dimension of each respective displayed retrieval icon.

12. A drawing management and display device according to claim 1, wherein said selective display designating means includes a means for storing a table of values including indicators of respective areas of said system drawing and a priority designated for each respective area, and further including a means responsive to an indicator of an area of said system drawing for selecting a sub-drawing of that area designated by the priority in said table of values.

13. A drawing management and display device according to claim 12, further including a input means for editing said table of values to change the priority designated for a respective area of said system drawing.

14. A drawing management and display device for managing divided facility drawings having the same magnification of an entire facility as digital information, said drawing management and display device comprising:

a first means for referencing a total display time for displaying said system drawing, for determining a plurality of different display time priority levels each having a different display time which is shorter than said total display time, and for storing divided facility drawings with respective priorities each of which represents an ability to display a desired facility drawing within a different said different display time when combining at least selected ones of features of said divided facility drawings;

a drawing inputting means for editing said divided facility drawings stored in said first means;

a data inputting means for inputting attribute information to be stored in the first means;

a second means for temporarily storing said divided facility drawings stored in said first means and temporarily storing said divided facility drawings given from said drawing inputting means; and a means for displaying said divided facility drawings stored in said second means and said attribute information.

* * * * *